United States Patent [19]

James

[11] Patent Number: 4,841,660
[45] Date of Patent: Jun. 27, 1989

[54] FISHING ROD HOLDER

[76] Inventor: Francis O. James, 1160 E. Meadowmere, Springfield, Mo. 65807

[21] Appl. No.: 197,293

[22] Filed: May 23, 1988

[51] Int. Cl.⁴ .................... A01K 97/10; A01K 97/00
[52] U.S. Cl. .................................. 43/21.2; 43/54.1; 224/200; 224/920; 224/922; 248/538; 292/292
[58] Field of Search ............... 43/21.2, 54.1, 15, 17; 224/200, 920, 922; 248/514, 538; 403/324, 328; 292/292, 150, 152

[56] References Cited

U.S. PATENT DOCUMENTS

| | | | |
|---|---|---|---|
| 565,001 | 8/1896 | Horton | 43/21.2 |
| 2,184,583 | 12/1939 | Danko | 43/21.2 |
| 2,287,641 | 6/1942 | Russell | 248/538 |
| 3,470,648 | 10/1969 | Bowker | 43/21.2 |
| 3,543,432 | 12/1970 | Gates | 43/21.2 |
| 3,555,719 | 1/1971 | Butler | 43/21.2 |
| 3,773,369 | 11/1973 | Wersonick | 292/292 |

Primary Examiner—Nicholas P. Godici
Assistant Examiner—William S. Andes
Attorney, Agent, or Firm—Kokjer, Kircher, Bradley, Wharton, Bowman & Johnson

[57] ABSTRACT

A fishing rod holder which mounts on the hinged lid of a tackle box and allows the lid to be opened and closed without disturbing the rod holder. A mounting base is bolted on top of the tackle box lid and receives one or more rod holding brackets which are latched to the base in a manner permitting them to turn to track a fish. Each bracket is a C-shaped device having a wire gate which closes its open side after the rod has been passed through it and into the bracket. The brackets can be removed from the base and stored in the tackle box when not in use.

17 Claims, 2 Drawing Sheets

FISHING ROD HOLDER

BACKGROUND AND SUMMARY OF THE INVENTION

This invention relates generally to fishing gear and more particularly to a device for holding a fishing rod.

It is not unusual for fisherman to temporarily lay down their rods and reels so that they can engage in other activities without the need to reel in the fishing line. This practice can result in dirt and other contaminants being picked up on the reel or rod. More importantly, a fish striking on the bait can pull the rod and reel into the lake or river, resulting in the loss of often expensive fishing equipment. The rod holding devices that have been proposed in the past generally have either a stake which is driven into the ground on a river or lake bank or a complicated mounting system for securing them to a boat or to a dock. These devices are thus useful either on a bank or on a boat but not in both places.

The primary goal of the present invention is to provide a rod holding device which mounts on a fishing tackle box so that the rod holder may be used on a bank, a dock, a boat or any other fishing area. Because the fisherman always has his tackle box with him during fishing activities, the rod holder is available for convenient use at whatever location fishing takes place.

Another important feature of the invention is the ability of the rod holder to continue to hold the rod and reel in place even when the tackle box is opened. Consequently, access to the contents of the tackle box is not significantly impaired by the rod holding device, and the tackle box can be opened and closed without requiring the rod to be removed.

Yet another feature of importance is the latching mechanism which secures the rod holding bracket to the tackle box lid in a manner allowing the bracket to turn as necessary to track a fish and which may be quickly and easily released so that the bracket can be removed and stored in the tackle box when not in use.

A further object of the invention is to provide a rod holding device of the character described which detracts from neither the appearance nor the functional capabilities of the tackle box. The mounting base which serves to mount the rod holding bracket or brackets is a low profile structure which does not add appreciably to the weight of the tackle box or otherwise interfere with its intended function. At the same time, the mounting base is relatively inconspicuous and in any event does not adversely affect the appearance of the tackle box.

A still further object of the invention is to provide a device of the character described which is able to hold two separate fishing rods at the same time.

Additional features of the invention include the simple and economical construction of the rod holding device, the ease with which the rod holding brackets can be applied to and removed from the mounting base, the security with which the rods are held, and the ease with which the fishing rods can be inserted in and removed from the brackets.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
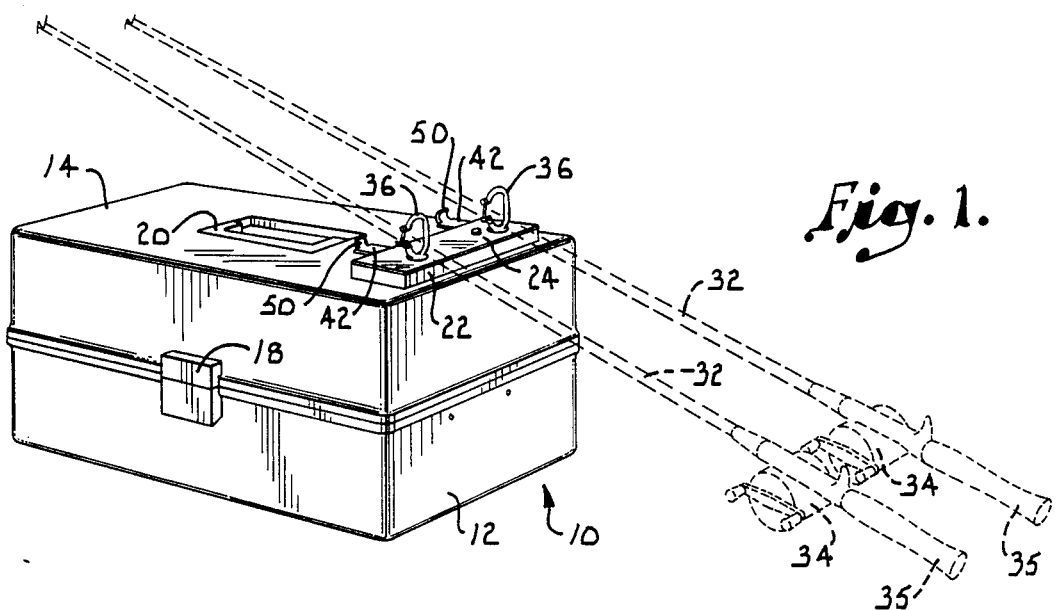
FIG. 1 is a perspective view showing a tackle box equipped with a rod holding device constructed according to a preferred embodiment of the present invention, with the lid of the tackle box closed and a pair of fishing rods depicted in broken lines.
Figure 2:
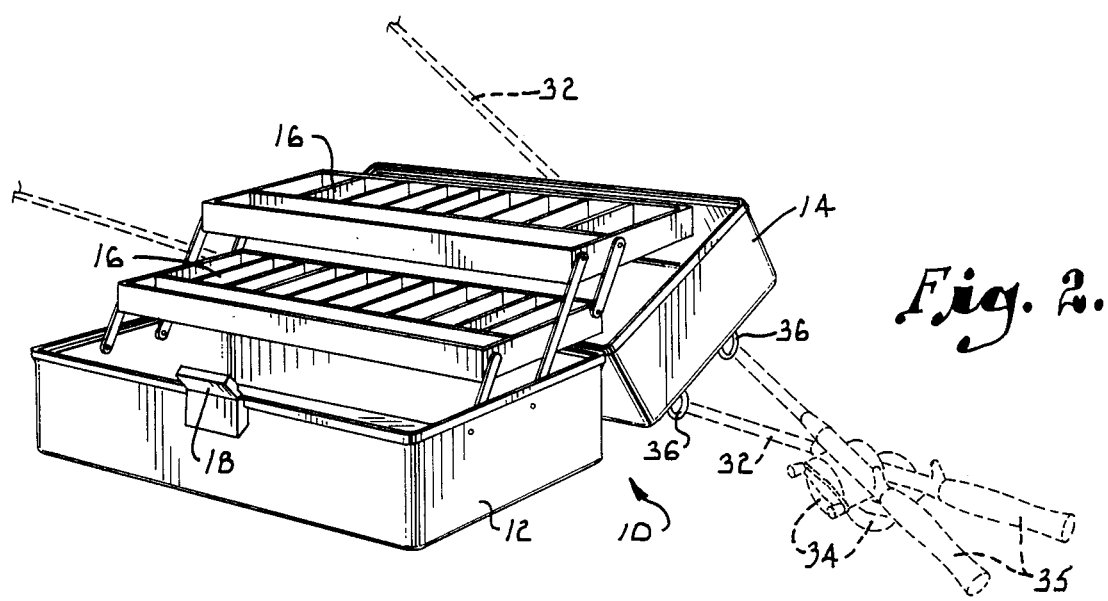
FIG. 2 is a perspective view of the tackle box shown in FIG. 1, but with the lid of the tackle box in its open position.

Referring now to the drawings in more detail and initially to FIGS. 1 and 2, numeral 10 generally designates a conventional fishing tackle box having a box-like body 12. A lid 14 is hinged to the body 12 and may be swung about the hinge axis 15 (FIG. 2) between the open position shown in FIG. 2 and the closed position shown in FIG. 1. In the open position, the interior of the body 12 and lid 14 are exposed, and access is provided to the contents of trays 16 which are located within the tackle box 10. A releaseable latch 18 holds lid 14 in the closed position. A pivotally mounted handle 20 is provided on top of the lid 14 to facilitate carrying of the tackle box. Fishing lures and other fishing tackle and gear may be carried in the tackle box 10 in the usual manner.

In accordance with the present invention, a rod holding device which may be mounted on the tackle box 10 includes a rectangular mounting base 22. The mounting base 22 may take the form of a block which is mounted on the upper surface of the lid 14 and which has a length less than the width of the lid. A retainer plate 24 fits on top of the base 22. A reinforcing plate 26 underlies base 22 and is located inside of the tackle box 10 against the inside surface of the lid 14. A pair of bolts 28 extend through the retainer plate 24, the mounting base 22, the lid 14 and the reinforcing plate 26. Nuts 30 are applied to the ends of the bolts to secure the mounting base 22 rigidly in place on the lid 14. The presence of the reinforcing plate 26 strengthens and reinforces the mounting arrangement and assists in securing base 22 in place on the tackle box.

A pair of fishing rods 32 equipped with reels 34 near their handle ends 35 may be held by a pair of C-shaped brackets 36 which are applied to base 22. Extending downwardly from the bottom of each bracket 36 is a cylindrical shank 38. The shanks 38 are received closely in cylindrical bores 40 which are formed through base 22 and plate 24 at locations near the opposite ends of the base. Each shank 38 is able to turn about a vertical axis coincident with the longitudinal axis of bore 40. Each bracket 36 is thus mounted such that it can turn about an axis which is perpendicular to the hinge axis 15 about which lid 14 opens and closes.

Each bracket 36 is retained on base 22 by a sliding latch plate 42. The latch plates 42 slide linearly in thin latch chambers 44 formed in the top of base 22 immediately beneath the retainer plate 24. The latch chambers 44 intersect with the bores 40. Near its upper edge, each of the shanks 38 has an annular groove 46 which aligns with latch chamber 44 when the shank is inserted in bore 40. Each latch plate 42 has an arcuate leading edge 48 having a size and shape to fit closely in the groove 46. Each latch plate 42 is normally maintained in a latching position in which edge 48 is received in groove 46 to latch bracket 36 to the mounting base 22 while permitting the bracket to turn about the axis of bore 40.

Each latch plate 42 may also be pulled outwardly in its chamber 44 to remove edge 48 from the groove 46 in a release position of the latch plate. Then, shank 38 is released and the bracket 36 may be removed from base 22 simply by pulling it upwardly to remove shank 38 from bore 40. The bracket 36 may then be stored inside the tackle box 10. Each latch plate 42 has a finger pull 50 on its projecting end which is located out of the latch chamber 44 at an accessible position where it can be reached with the fingers in order to facilitate pulling of the latch plate to its release position.

Each latch plate 42 is continuously urged toward its latching position by a tension spring 52. One end of each spring 52 is hooked to a lug 54 which is turned upwardly from the retainer plate 24. The other end of each spring 52 is hooked to a lug 56 which is turned upwardly from the latch plate 42. Consequently, when plate 42 is pulled to its release position, spring 52 is placed under tension and acts to return the latch plate to its latching position as soon as the finger pull 50 is released. The lower end of each shank 38 may be chamfered at 58, with the chamfer acting against edge 48 to permit shank 38 to be inserted into bore 40 without the need to manually pull the latch plate outwardly.

Each of the rod holding brackets 36 is a ring-like structure having an open passage 60 through it which is easily large enough to receive the fishing rod 32. However, each passage 60 is too small to permit reel 34 to pass through it.

Figure 5:
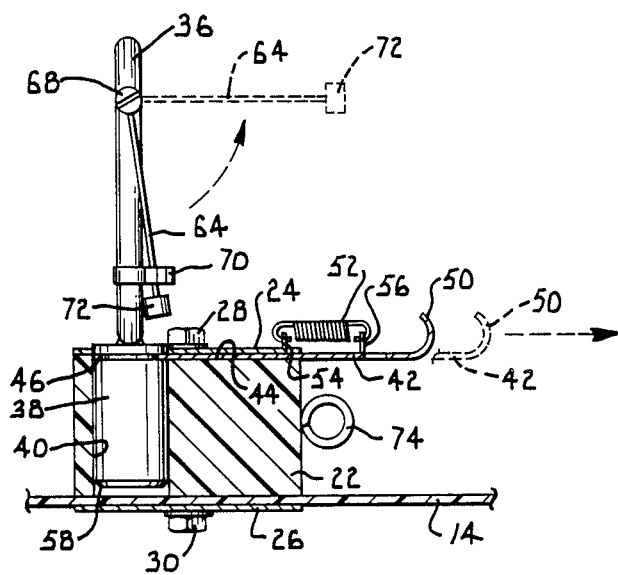
FIG. 5 is a fragmentary sectional view taken generally along line 5—5 of FIG. 4 in the direction of the arrows, with the broken lines showing the release position of one of the latch plates which retain the rod holding brackets on their mounting base.

The fishing rod 32 may be disposed in extension through the passage 60 by passing the rod through an access opening 62 formed in the side of each C-shaped bracket 36. Each opening 62 is normally closed by a gate arrangement which includes a wire 64 which is looped at its top end 66. A screw 68 extends through each loop 66 and is threaded into the bracket 36 immediately above opening 62. A spring clip 70 is mounted on each bracket 36 immediately below the opening 62 and includes a pair of prongs for receiving and holding the wire 64 between them. Each wire 64 may be swung about the axis of screw 68 between the open position shown in broken lines in FIG. 5 and the closed position shown in solid lines in FIG. 5. In the open position, opening 62 is exposed so that the fishing rod 32 can be passed through it into or out of the passage 60. In the closed position of wire 64, opening 62 is closed by the wire and the fishing rod is thereby retained in passage 60. The spring clip 70 latches wire 64 in its closed position and yet releases the wire when it is manually pivoted upwardly to its open position. A weight 72 is carried on the lower end of each wire 64 to normally bias each wire to its closed position.

In use, one or both of the rod holding brackets 36 may be applied to base 22 by inserting its shank 38 in the bore 40. One of the fishing rods 32 can be applied to each of the rod holding brackets 36 by moving wire 64 to its open position and inserting the rod through opening 62 before returning wire 64 to its closed position. The spring clip 70 thereafter holds wire 64 in the closed position and thus prevents the fishing rod from passing outwardly through opening 62.

The rods 32 may be placed with their handle ends 35 resting on the same surface on which the tackle box 10 rests. This gives the rods an upward incline so that the fishing line is not directly in line with the shaft of the fishing rod. If a fish should strike, it is not able to pull the fishing rod and reel with it into the lake or river because reel 34 is too large to pass through the passage 60 formed in bracket 36. The brackets 36 thus act to hold rods 32 in place for fishing and prevent them from being lost due to a fish striking.

Latch plate 42 holds bracket 36 securely on the base 22 and yet allows the bracket to turn about the axis of shank 38 in order to track a fish which strikes on the fishing line. Preferably, openings 62 are oriented toward the front of the tackle box 10 so that the rods 32 extend generally parallel to the long dimension of the tackle box. In addition, the tension or brake of reel 34 should be at least partially off to allow the fishing line to "give" in in the event of a strike. Added weight in the tackle box 10 increases the stability and thus enhances the performance of the rod holding device.

It is important to note that the lid 14 of the tackle box can be opened while the brackets 36 continue to hold the fishing rods 32. When the lid is moved to the open position shown in FIG. 2, rods 32 remain extended through the brackets and there is thus no need to remove the rods from the brackets or to reel in the fishing line in order to obtain access to the contents of the tackle box. When lid 14 is later closed, the rods 32 again assume the positions shown in FIG. 1.

Each bracket 36 can be removed and stored in the tackle box 10 when the bracket is not in use. The fishing rods 32 can be removed from the brackets by swinging each of the wires 64 upwardly to its open position and then passing the fishing rod outwardly through the exposed opening 62. The bracket can then be removed by pulling on the finger pull 50 to release latch plate 42 and then pulling upwardly on bracket 36 to remove shank 38 from bore 40. Because of their small sizes, brackets 36 can be easily stored in the tackle box.

Although the invention has been illustrated and described as functioning with two of the rod holding brackets 36 for holding two fishing rods 32, it is to be understood that the device can include only one of the brackets 36 or in some cases more than two of the brackets. It is contemplated that relatively large tackle boxes will be equipped with two of the brackets 36, while smaller tackle boxes will be equipped with only a single bracket. When two rods are used simultaneously, one fishing line should be extended farther than the other so that one line can extend over the other to avoid tangling of the two lines.

It is important to recognize that the rod holding device of the present invention can be used any place where the tackle box 10 can rest on a suitable horizontal surface. For example, the rod holding device can be used with the tackle box 10 resting on a river or lake bank, on a dock or pier, or on various surfaces within a boat such as the bottom of a small fishing boat. It should also be understood that the rod holding device is constructed so that it is able to accommodate fishing rods 32 and reels 34 having various sizes, shapes and styles.

Figure 3:
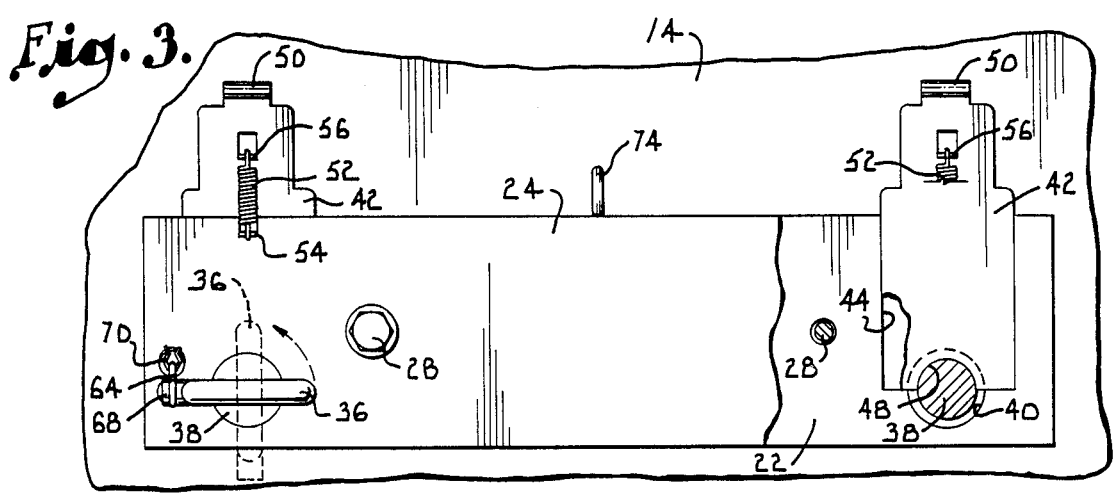
FIG. 3 is a top plan view of the rod holding device on an enlarged scale, with portions broken away for purposes of illustration.
Figure 4:
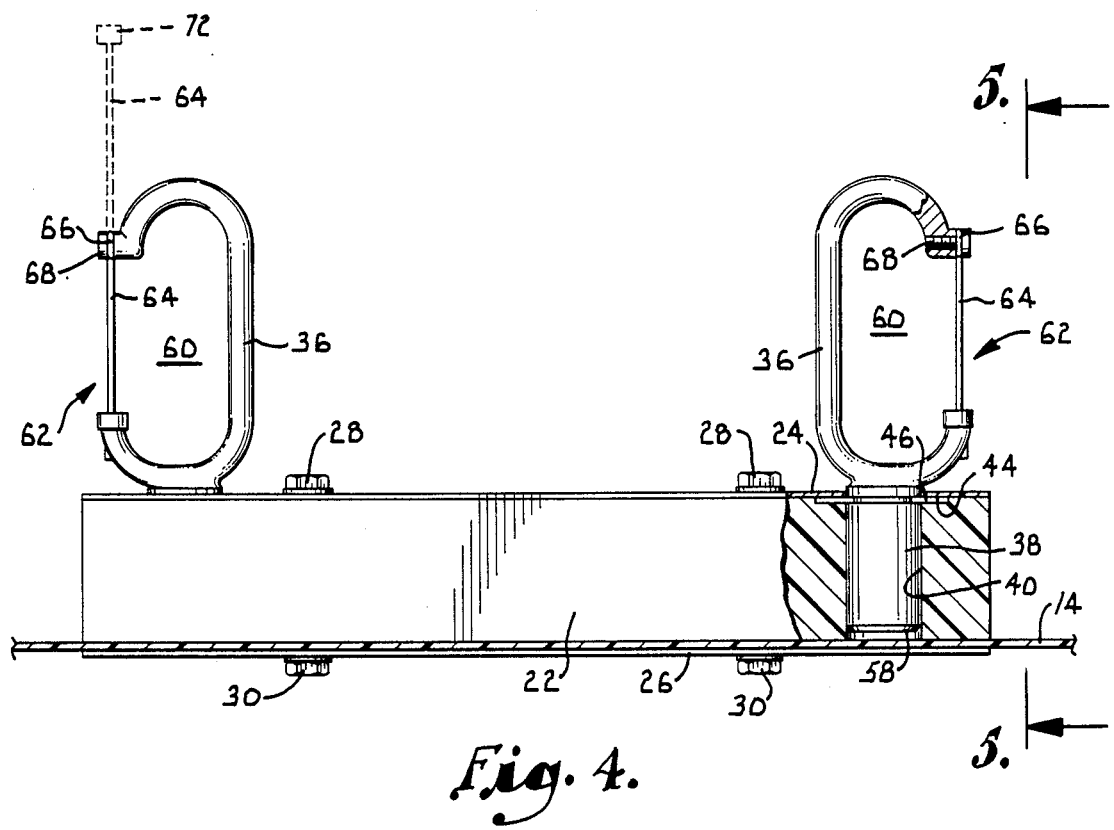
FIG. 4 is a side elevational view of the rod holding device, with portions broken away and shown in section for purposes of illustration.

A ring 74 (see FIGS. 3 and 5) may be provided on the mounting base 22 to provide a connection for a fish stringer.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A fishing rod holder for attachment to a tackle box, said rod holder comprising:
    a mounting base;
    means for attaching said base to the tackle box;
    a bracket presenting a passage large enough to receive a fishing rod in extension therethrough but small enough to prevent a reel carried on the rod from passing therethrough; and
    means for mounting said bracket on said base in a manner permitting the bracket to turn about a substantially vertical axis, said mounting means comprising a substantially cylindrical bore in said base, a shank on said bracket received in said bore, and means for securing said shank in said bore while permitting the shank to turn in the bore to allow the fishing rod to track a fish hooked thereby.

2. The rod holder of claim 1, including:
    an access opening in said bracket through which the fishing rod may be passed into and out of said passage; and
    gate means for opening and closing said access opening.

3. The rod holder of claim 2, wherein said gate means comprises:
    a gate member mounted on said bracket for pivotal movement between open and closed positions wherein the gate member respectively opens and closes the access opening; and
    releaseable latch means for latching the gate member in its closed position.

4. The rod holder of claim 1 wherein said securing means comprises means for releasably latching said shank in said bore.

5. The rod holder of claim 4, wherein said releaseable latching means comprises:
    a latch plate mounted on said base for movement between a latching position wherein the latch plate engages the shank in a manner to hold same in the bore while allowing the shank to turn therein and a release position wherein the latch plate is released from the shank to permit said bracket to be removed from the base for storage when not in use; and
    yieldable means for urging said latch plate toward the latching position.

6. The rod holder of claim 5, including:
    an annular groove in said shank; and
    an arcuate edge of said latch plate fitting closely in said groove in the latching position.

7. The rod holder of claim 5, including:
    a latch chamber in said base in which said latch plate slides between the latching and release positions; and
    a finger pull on said latch plate located out of said chamber at an accessible position to permit the latch plate to be pulled from the latching position to the release position.

8. The rod holder of claim 1, including:
    a second bracket presenting a passage therethrough large enough to receive a second fishing rod in extension therethrough but small enough to prevent a reel carried on the second rod from passing therethrough; and
    means for mounting said second bracket on said base at a location spaced from the first mentioned bracket and in a manner permitting the second bracket to turn about a substantially vertical axis.

9. A fishing rod holder for attachment to a fishing tackle box having a body and a lid hinged to the body for movement between open and closed positions, said rod holder comprising:
    a mounting base;
    meanss for mounting said base on the lid of the tackle box for movement with the lid between the open and closed positions thereof;
    a bracket presenting a passage therethrough large enough to receive a fishing rod in extension therethrough but small enough to prevent a reel carried on the rod from passing therethrough, said bracket presenting an access opening through which the rod may be passed into and out of said passage;
    gate means for selectively opening and closing said access opening; and
    means for mounting said bracket on said base in a manner permitting the bracket to turn relatively to the base and to move with the base while retaining the rod in extension through said passage when the lid is swung between the open and closed positions, said mounting means for the bracket comprising a latch element on the base having a latching position wherein the bracket is latched on the base and a release position wherein the bracket is released and may be removed from the base for storage when not in use and yieldable means for normally maintaining said latch element in the latching position thereof.

10. The rod holder of claim 9, wherein said mounting means for the base comprises:
    a reinforcing plate on the inside of the lid of the tackle box at a location to underlie the base in the closed position of the lid; and
    a plurality of fasteners extending through said base, lid and reinforcing plate.

11. The rod holder of claim 9, including:
    a second bracket presenting a passage therethrough large enough to receive a second fishing rod in extension therethrough but small enough to prevent a reel carried on the second rod from passig therethrough, said second bracket presenting an access opening through which the second rod may be passed into and out of said passage of the second bracket;
    gate means for selectively opening and closing said access opening of the second bracket; and
    means for mounting said second bracket on said base at a location spaced from the first mentioned bracket and in a manner permitting the second bracket to turn relative to the base and to move with the base while retaining the second rod in extension through the passage thereof when the lid is swung between the open and closed positions.

12. The rod holder of claim 11, wherein the mounting means for each bracket is arranged to selectively release the bracket for removal from the base.

13. The rod holder of claim 9, wherein said bracket has a C-shaped configuration.

14. In combination with a fishing tackle box having a body and a lid hinged to the body for movment about a hinge axis between open and closed positions, a device for holding a fishing rod equipped with a reel, comprising:

a mounting base secured on top of the lid of the tackle box, said base having a substantially cylindrical bore therein extending generally perpendicular to the hinge axis;

a generally ring shaped bracket for receiving the rod in extension therethrough, said bracket being too small to allow the reel to pass through it and said bracket having an access opening through which the rod may be passed into and out of the bracket;

a gate mounted on said bracket for pivotal movement to open and close said access opening; and a shank extending from the bracket and received in said bore in a manner to turn therein about an axis substantially perpendicular to the hinge axis to allow a rod extending through said bracket to track a fish hooked by the rod.

15. The device of claim 14, including means for latching said shank in the bore, said latching means being substantially releasable to permit said bracket to be removed from said base for storage in the tackle box when not in use.

16. The device of claim 15, wherein said latching means comprises:

a latch plate mounted on said base for movement between a latching position wherein the latch plate engages the shank in a manner to hold same in the bore while allowing the shank to turn therein and a release position wherein the latch plate is released from the shank to permit said bracket to be removed from the base for storage when not in use; and yieldable means for urging said latch plate toward the latching position.

17. The rod holder of claim 16, including:

a latch chamber in said base in which said latch plate slides between the latching and release positions, and;

a finger pull on said latch plate located out of said chamber at an accessible position to permit the latch plate to be pulled from the latching position to the release position.

* * * * *